United States Patent
Fujinaga (10) Patent No.: US 7,377,422 B2
(45) Date of Patent: May 27, 2008

(54) INFORMATION PROCESSING APPARATUS AND CONTROL METHOD THEREFOR

(75) Inventor: Seiya Fujinaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 271 days.

(21) Appl. No.: 11/218,519

(22) Filed: Sep. 6, 2005

(65) Prior Publication Data

US 2006/0049245 A1  Mar. 9, 2006

(30) Foreign Application Priority Data

Sep. 6, 2004 (JP) ............................. 2004-258407

(51) Int. Cl.
*G06F 17/00* (2006.01)
(52) U.S. Cl. ..................................................... 235/375
(58) Field of Classification Search ............... 235/375, 235/380, 435–454
See application file for complete search history.

(56) References Cited

U.S. PATENT DOCUMENTS

| 6,170,743 B1* | 1/2001 | Okaue et al. ............. 235/380 |
| 2003/0090946 A1* | 5/2003 | Fukushima ............... 365/200 |
| 2003/0123074 A1 | 7/2003 | Imai et al. ................ 358/1.9 |

FOREIGN PATENT DOCUMENTS

| JP | 10-136299 A | 5/1998 |
| JP | 2003-103833 A | 4/2003 |
| JP | 2003-103883 | 4/2003 |

* cited by examiner

*Primary Examiner*—Jamara A Franklin
(74) *Attorney, Agent, or Firm*—Fitzpatrick, Cella, Harper & Scinto

(57) ABSTRACT

In an information processing apparatus capable of accessing a memory card connected to the information processing apparatus and a control method for the information processing apparatus, in a case where a mode for disabling data writing in the memory card is set, at a point when a memory card is connected, an operation mode set in the information processing apparatus is automatically changed to an operation mode for not performing data writing in the memory card.

8 Claims, 10 Drawing Sheets

| CARD WRITING | COPY | SCAN | FILM | PHOTO |
|---|---|---|---|---|
| DISABLED | × | × | × | × |
| ENABLED | ○ | ○ | ○ | × |

MEMORY CARD IS INSERTED.
DO YOU WRITE DATA IN MEMORY CARD?

YES  NO

FIG. 10

INFORMATION PROCESSING APPARATUS AND CONTROL METHOD THEREFOR

FIELD OF THE INVENTION

The present invention relates to an information processing apparatus, which is capable of accessing a connected memory card, and a control method therefor.

BACKGROUND OF THE INVENTION

It is quite common for a multi-function apparatus into which a memory card can be mounted, to read or write data to the memory card onto which image data photographed by a digital camera or the like could be stored (Japanese Patent Laid-Open No. 10-136299).

Such multi-function apparatuses often comprise functions to either read out data from the mounted memory card or write data to the memory card. On the other hand, there also exists multi-function apparatuses that enable reading and writing data from/to the memory card using a personal computer (PC) or the like connected to the multi-function apparatus.

For multi-function apparatuses, the memory card can often be accessed numerous times. Thus, in some cases, the multi-function apparatus can be set to disable the process of writing data in the memory card from a personal computer connected to the multi-function apparatus such that unexpected rewriting of the memory card by a user can be prevented. When printing is instructed from an external apparatus, the multi-function apparatus disables data writing in the memory card such that data stored in the memory card is not destroyed (Japanese Patent Laid-Open No. 2003-103883).

Such a multi-function apparatus alone has the ability to write data in the memory card or disable data writing in the memory card. When operation modes of a multi-function apparatus having a display function are considered, a display mode for displaying image data of a memory card by mounting the memory card to a multi-function apparatus main body is conceivable. Also a mode for writing data in the memory card from an external apparatus such as a PC by mounting the memory card to the multi-function apparatus main body is conceivable.

When data writing in the memory card is prohibited according to a setting in the multi-function apparatus, it is considered that a user wants to prevent image data stored in the memory card to be destroyed and also wants to view the image data stored in the memory card. However, even in such a case, there is a deficiency in that, when the user mounts the memory card to the multi-function apparatus, the multi-function apparatus is not shifted to the display mode for displaying images stored in the memory card unless the user operates the multi-function apparatus. Therefore, unless the user sets the display mode in the multi-function apparatus every time, he or she cannot view the content of the memory card.

Thus, there is a demand for a control method that makes it possible to change an operation mode dynamically according to a user's intention. This intention reflects a mode change of an apparatus that is capable of accessing a memory card mounted to the apparatus and also allows reading and writing of data in the memory card from an external apparatus such as a personal computer connected to the apparatus.

SUMMARY OF THE INVENTION

It is an object of the invention to solve the disadvantages of the conventional technique described above.

The invention is characterized by providing an information processing apparatus and its control method, to set the operation mode of the information processing apparatus to be operated by a user according to a memory card access mode.

According to an aspect of the present invention, there is provided with an information processing apparatus, comprising:

an interface unit configured to connect with a memory card;

disable mode setting means for setting a write disable mode for disabling data writing in a memory card;

mode setting means for setting an operation mode; and mode change means for, in a case where the memory card is connected to the interface unit and the write disable mode is set by the disable mode setting means, changing an operation mode set by the mode setting means to an operation mode for disabling data writing in the memory card.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the invention will be explained in detail with reference to the accompanying drawings. Note that the embodiments described below do not limit the invention according to claims and all combinations of characteristics explained in the embodiments are not always essential for means for solving the problems in the invention.

Figure 1:
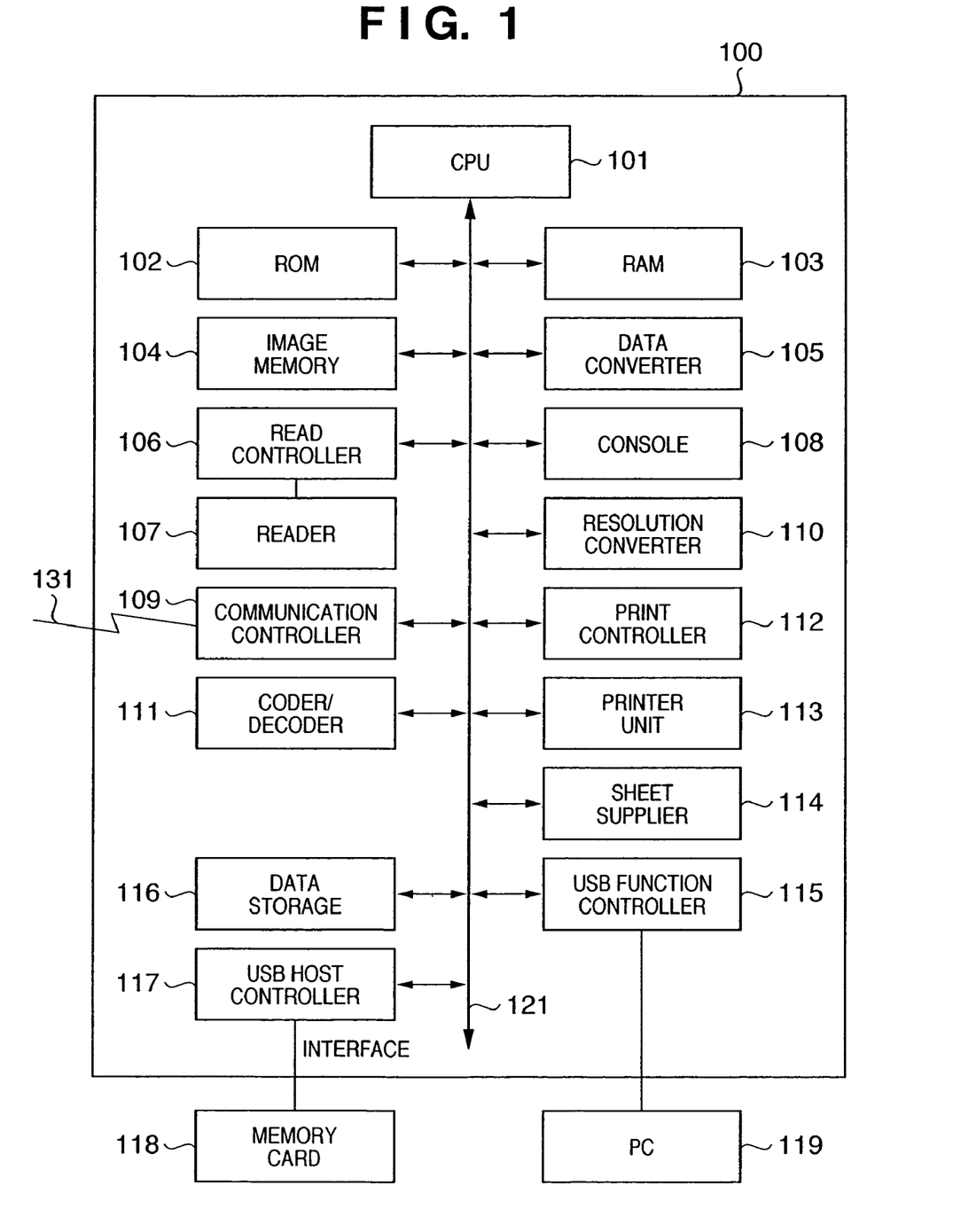
FIG. 1 is a block diagram showing a constitution of an image processing apparatus according to an embodiment of the invention.

FIG. 1 is a block diagram showing a constitution of an image processing apparatus (a multi-function apparatus having functions of a copying machine, a facsimile apparatus, and a printer apparatus) according to an embodiment of the invention.

Figure 2:
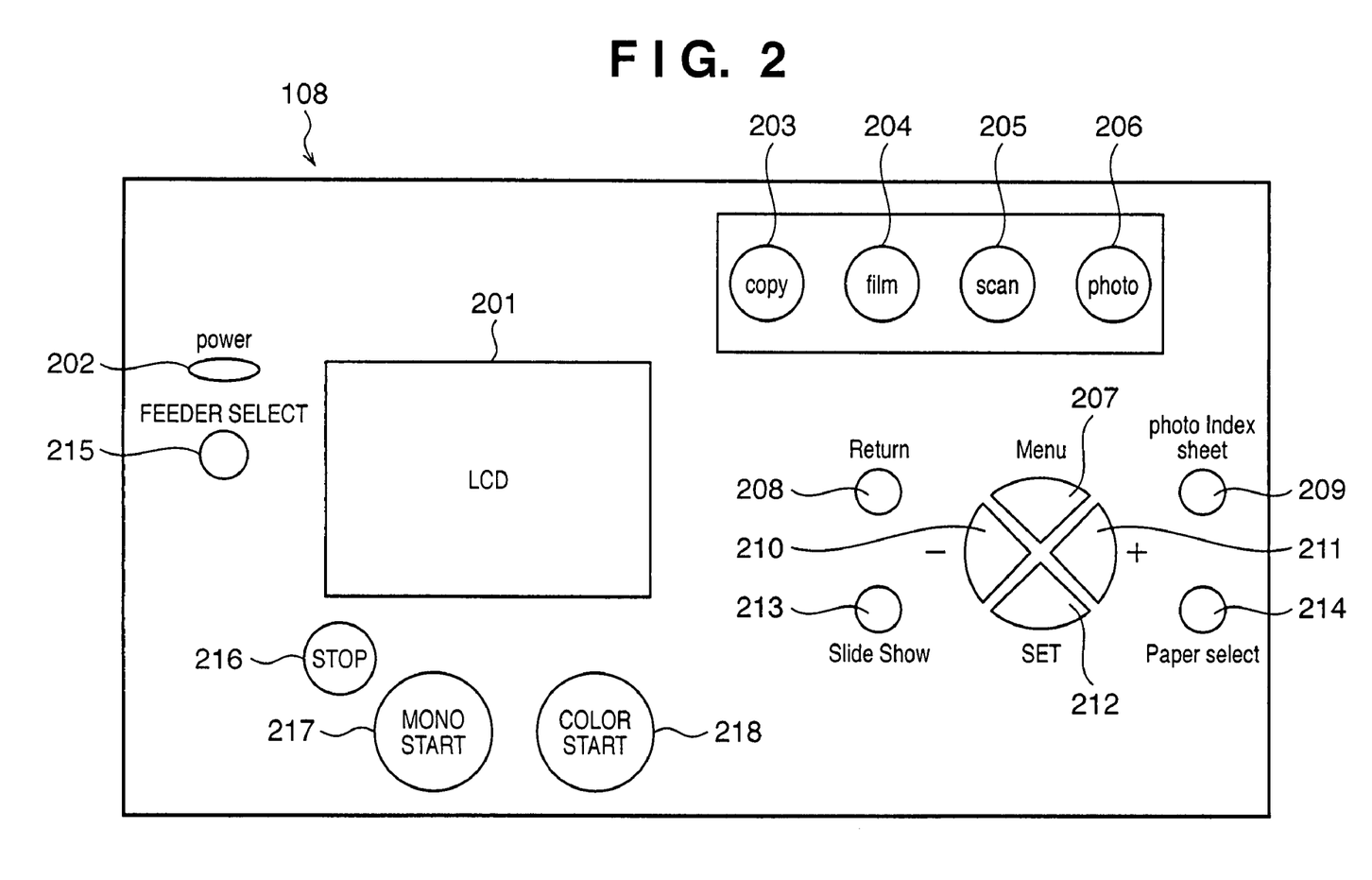
FIG. 2 depicts a view for explaining a specific example of operation keys of a console according to the embodiment.

In the figure, a Central Processing Unit (CPU) 101 controls operations of the entire apparatus according to programs stored in a Random Access Memory (RAM) 103 or a Read Only Memory (ROM) 102. The ROM 102 stores the control programs, a built-in Operating System (OS) program, and the like executed by the CPU 101. In this embodiment, the control programs stored in the ROM 102 are programs for performing software control such as scheduling and task switching under the management of the built-in OS stored in the ROM 102. The RAM 103 is constituted by a static RAM (SRAM) or the like. The RAM 103 stores programs executed by the CPU 101, control variables for the programs, and the like or stores set values registered by an operator, management data of an image processing apparatus 100, and the like. Moreover, various work buffer areas are provided in the RAM 103.

An image memory 104 is constituted by a Dynamic Random Access Memory (DRAM) or the like and accumulates image data. A data converter 105 performs, for example, data analysis for a Page Description Language (PDL) and the like, Computer Graphics (CG) development for character data, and conversion of image data. A read controller 106 controls a reader 107 such as a scanner to optically read an original with a Contact Image. Sensor (CIS). In addition, the read controller 106 converts an image signal obtained by reading the original into image data, applies various kinds of image processing such as binarization processing and halftone processing to the image data via an image processor (not shown), and outputs the image data as high-definition image data. Note that, in this embodiment, the read controller 106 is applicable to both a sheet reading control system for reading an original while conveying an original and a book reading control system for scanning an original placed on an original stand. A console 108 includes a numerical value input key, a character input key, a one-touch telephone number key, a mode setting key, a determination key, and a cancellation key. The console 108 has an operation unit, with which a user inputs data for designating a transmission destination and designates setting data for registered values, setting for a power saving mode, and the like, various keys, a Light-Emitting Diode (LED), and a Liquid Crystal Display (LCD). The console 108 also has a display 201 (FIG. 2) for displaying various kinds of input operation by the user, an operation state of the image processing apparatus 100, and a status of the image processing apparatus 100, and the like. Image data in the memory card 118 is also displayed on the console 108. Note that, in displaying the image data in the memory card 118, the image data is rendered into image data, which is used in printing, by the data converter 105.

A communication controller 109 includes a modem and a Network Control Unit (NCU). In this embodiment, the communication controller 109 is connected to an analog communication line (PSTN) 131 and performs communication control conforming to the T30 protocol and line control such as outgoing call and incoming call for a communication line. A resolution converter 110 performs resolution conversion control such as millimeter-to-inch resolution conversion for image data. Note that the resolution converter 110 is also capable of performing expansion and reduction processing for image data. A coder/decoder (CODEC) 111 can encode image data treated in this image processing apparatus 100 in, for example, MH, MR, MMR, JBIG, or JPEG and perform decoding processing and expansion/reduction processing. A print controller 112 applies smoothing processing, density correction processing, and various kinds of image processing such as color correction to image data, which is to be printed, via an image processor (not shown), converts the image data into high-definition image data, and outputs the image data to a printer unit 113. In addition, the print controller 112 controls the printer unit 113 to thereby acquire state information of the printer unit 113 periodically. The printer unit 113 includes a printer engine for a laser beam printer, an ink-jet printer, or the like and prints color image data or monochrome image data on a print member (a recording sheet). A sheet supplier 114 accommodates recording sheets on which data is recorded by the printer unit 113. A recording sheet is supplied from the sheet supplier 114 to the printer unit 113 according to control of the print controller 112 and an image is printed on the recording sheet. In particular, in order to hold plural kinds of recording sheets, it is possible to mount plural sheet feeding cassettes on the sheet supplier 114. In this case, the print controller 112 can designate a sheet feeding cassette, from which a sheet is fed, and perform printing.

A USB function controller 115 performs communication control for a USB interface. The USB function controller 115 performs protocol control according to a USB communication standard, converts data from a USB control task executed by the CPU 101 into a USB packet, and transmits the USB packet to an information processing device (a PC 119) on the outside. Conversely, the USB function controller 115 receives a USB packet from the information processing device (the PC 119) on the outside, converts the USB packet into data, and transmits the data to the CPU 101. A data storage 116 accumulates various kinds of data. In this embodiment, since an area for data backup is not prepared in the image memory 104, a data storage area for backup is prepared in the data storage 116. Note that, when the image memory 104 has the area for data backup, the data storage 116 does not have to be provided specifically. A USB host controller 117 is a control unit for performing communication according to a protocol defined in the USB communication standard. The USB communication standard is a standard with which bidirectional data communication can be performed at high speed. Plural hubs or functions (slaves) can be connected to one host (master). A memory card 118 is a data storage medium, which can be connected to the image processing apparatus 100. In this embodiment, the memory card 118 is connected to the USB host controller 117 via an interface. However, the memory card 118 does not always have to be connected to the USB host controller 117 and may be mounted to the apparatus main body via, for example, a card slot. Data of images and other electronic data are stored in the memory card 118. It is possible to access data in the memory card 118 through the USB host controller 117. Note that the USB host controller 117 has a function of detecting, when the memory card 118 is mounted, the mounting and notifying the CPU 101 of the mounting. Note that, in this embodiment, USB communication uses a one-to-one connection form. The components 101 to 106 and 108 to 117 are connected to one another via a CPU bus 121 managed by the CPU 101.

FIG. 2 depicts a view for explaining a specific example of operation keys of the console 108 according to this embodiment. Note that a ten key, a character input key, a one-touch telephone number key, and the like are not shown in the figure.

The console 108 has a liquid crystal display (LCD) 201, a power key (power) 202, a copy mode key (copy) 203, a film mode key (film) 204, a scan mode key (scan) 205, a photo mode key (photo) 206, a menu key (Menu) 207, a return key (Return) 208, a photo index sheet key (photo index sheet) 209, a minus key (−) 210, a plus key (+) 211, a set key (SET) 212, a slide show key (Slide Show) 213, a sheet setting key (Paper select) 214, a feeder select key (FEEDER SELECT) 215, a STOP key (STOP) 216, a monochrome start key (MONO START) 217, and a color start key (COLOR START) 218.

The LCD 201 displays a message, an operation prompt, and various kinds of information. The power key 202 is a key for turning ON/OFF a power supply for the image processing apparatus 100. The copy mode key 203 is a key for setting the image processing apparatus 100 in an operation mode in which the image processing apparatus 100 can perform copying. When the copy mode key 203 is depressed, the image processing apparatus 100 is set to a copy mode. The film mode key 204 sets the image processing apparatus 100 in a film mode for allowing the image processing apparatus 100 to perform film printing. The scan mode key 205 is a key for instructing scan reading for an original image by the reader 107. The photo mode key 206 is a key for bringing the image processing apparatus 100 into a state in which the image processing apparatus 100 can perform direct printing from a memory card or a camera that stores digital photographs. When the photo mode key 206 is depressed, it is possible to set the image processing apparatus 100 to a photo print mode.

The menu key 207 is a key for displaying items for setting set values in executing various kinds of processing such as copy, fax, and direct printing of images stored in a memory card. When the menu key 207 is depressed, various setting items are displayed on the LCD 201. A user can select an item by moving a cursor on a screen of the LCD 201 with the plus key 211 or the minus key 210 and set the selected item with the set key 212. The return key 208 is a key that is used to proceed operation backward when the user registers a set value. The photo index sheet key 209 is a key for shifting to a screen for printing or reading a photo index sheet of images stored in the memory card 118. When the photo index sheet key 209 is depressed in a state in which the memory card 118 is mounted to the image processing apparatus 100, the image processing apparatus 100 shifts to a screen on which the user can instruct printing or reading of the photo index sheet, that is, an index screen. In a state in which this index screen is displayed, the user can select reading or printing by operating the plus key 211, the minus key 210, or the like. The user can further designate a desired image with the set key 212. The minus key 210 and the plus key 211 are keys that are used when the user selects an item from plural options in selecting a menu or an image or performing user registration. Minus and plus correspond to backward and forward of a moving direction of a cursor, respectively. The set key 212 is a key for determining an item selected by the cursor.

The slide show key 213 designates images in the memory card 118 such that the images are displayed on the LCD 201 in order. The sheet setting key 214 is a key for performing sheet setting for copying and other kinds of printing. The feeder select key 215 is a key that is used for switching, when a sheet feeding unit of the sheet supplier 114 includes plural sheet feeding cassettes, a sheet feeding cassette to be used. The stop key (STOP) 216 is a key for stopping facsimile transmission and reception, copying, and other kinds of operation. The monochrome start key 217 is a key for starting black and white facsimile transmission, black and white copying, and the like. The color start key 218 is a key for starting color facsimile transmission, color copying, color photograph printing, and the like.

Figure 3:
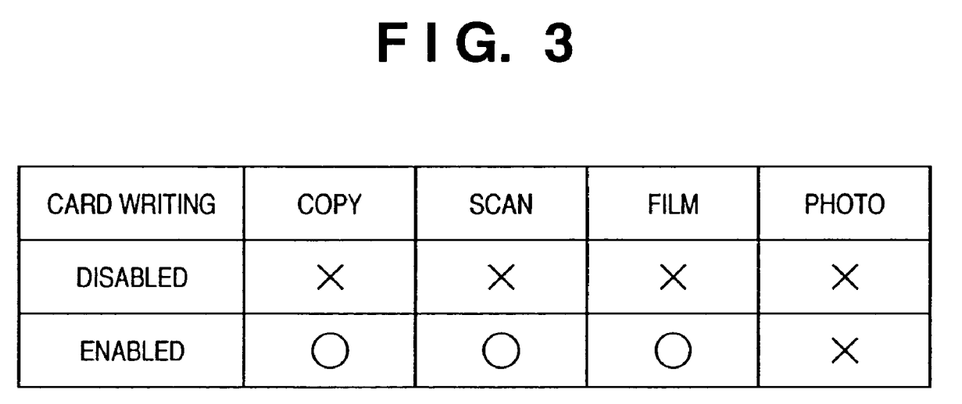
FIG. 3 depicts a table for explaining propriety of data writing in a memory card in the image processing apparatus according to the embodiment.

FIG. 3 depicts a table for explaining propriety of data writing in the memory card 118 in the image processing apparatus in this embodiment.

The image processing apparatus 100 in this embodiment has four operation modes, namely, copy, scan, film, and photo, which are set by the mode keys 203 to 206, respectively. The copy mode is a mode for performing a copy operation. The scan mode is a mode for transmitting image data read by the reader 107 to the PC 119, which is connected to the imaging processing apparatus 100 via the USB function controller 115, as electronic information. The film mode is a mode for reading a film of a camera with the reader 107 and printing an image of the film with the printer unit 113. The photo mode is a mode for displaying image data in the memory card 118 on the LCD 201 in a case where the memory card 118 is mounted. In the photo mode, it is also possible to print the image data stored in the memory card 118. It is possible to shift these modes to operation modes corresponding thereto by depressing the mode keys 203 to 206.

In FIG. 3, it is explained whether it is possible to write data in the memory card 118 is possible in the respective operation modes. In the image processing apparatus 100 in this embodiment, the user can "disable " or "enable" data writing in the memory card 118 by reading out an item, for which enabling/disabling of data writing in the memory card 118 is set, with the menu key 207 and selecting "enable" or "disable" in the item to press the set key 212. The image processing apparatus 100 can determine propriety of data writing in the memory card 118 from the PC 119.

In this embodiment, in a case where data writing in the memory card 188 is set to "disable", the image processing apparatus 100 disables data writing in the memory card 118 in all the operation modes. On the other hand, in a case where data writing in the memory card 188 is set to "enable", the image processing apparatus 100 allows data writing in the memory card 118 in the operation modes other than the photo mode. However, at the time of the photo mode, the image processing apparatus 100 disables data writing in the memory card 118 regardless of the setting.

As described above, in this embodiment, in a case where the data writing in the memory card 118 is set to "disable", the image processing apparatus 100 disables data writing in the memory card 118 from the outside (the PC 119). In a case where data writing in the memory card 118 is set to "enable", other than the photo mode in which the memory card 118 is used, the image processing apparatus 100 enables data writing in the memory card 118. In this way, the image processing apparatus 100 performs exclusive control for the memory card 118.

Note that, in the explanation of this embodiment, there are the four operation modes. However, the invention is not limited to these modes. If data writing in the memory card 118 is disable d, not only data writing in the memory card 118 but also processing for manipulating data in the memory card 118 is disable d.

Figure 4:
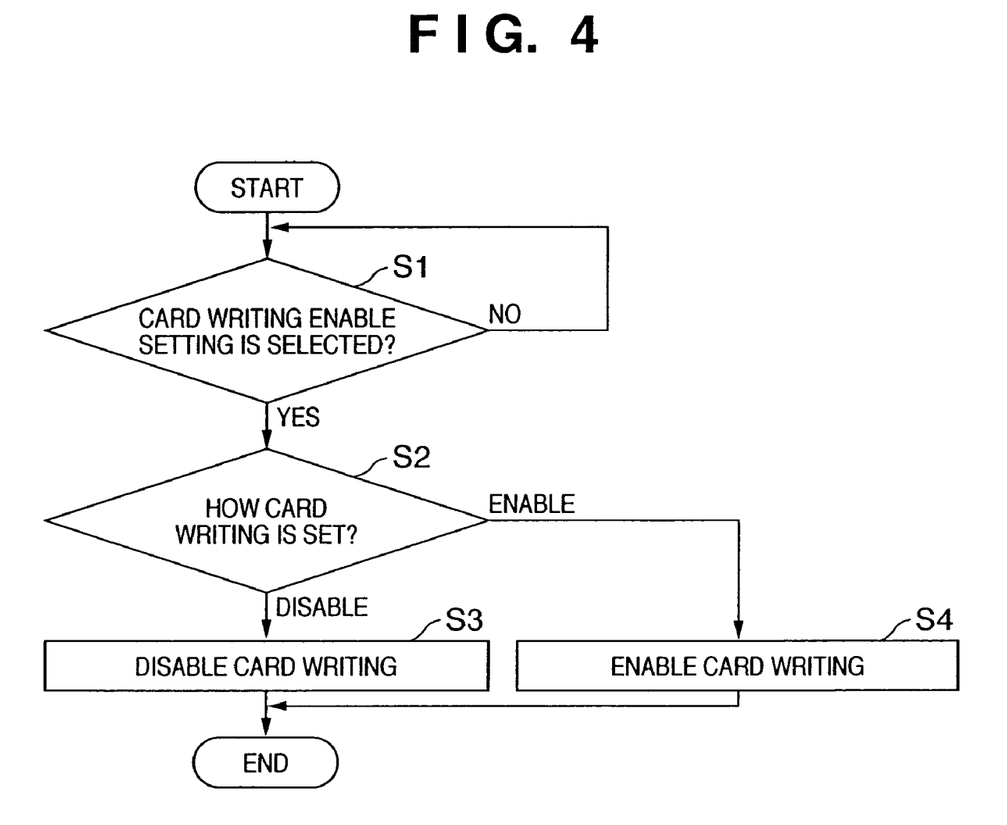
FIG. 4 is a flowchart for explaining processing for "enabling"/"disabling" data writing in the memory card in the image processing apparatus according to the embodiment.

FIG. 4 is a flowchart for explaining processing for "enabling"/"disabling" data writing in the memory card 118 in the image processing apparatus 100 in this embodiment. A program for executing this processing is stored in the ROM 102 and executed by the CPU 101.

First, in step S1, when the menu key 207 is pressed and the items for setting enabling/disabling of data writing in the memory card 118 are displayed. Then, the flow advances to step S2, the plus key 211 and the minus key 210 are operated and "enable" or "disable" of data writing in the memory card 118 is selected. When the plus key 211 and the minus key 210 are operated in a state in which the items for setting enabling/disabling of data writing in the memory card 118 are displayed, "enable" and "disable" are displayed alternately. When a user depresses the set key 212 in that state, the "enable" or "disable" mode selected at that point is set. In a case where data writing in the memory card 118 is set to "disable" in step S2 in this way, the flow proceeds to step S3 and sets data writing in the memory card 118 to "disable". On the other hand, in a case where data writing in the memory card 118 is set to "enable" in step S2, the flow advances to step S4, the CPU 101 sets data writing in the memory card 118 to "enable". Note that the set "enable" or "disable" mode is stored in the RAM 103.

Figure 10:
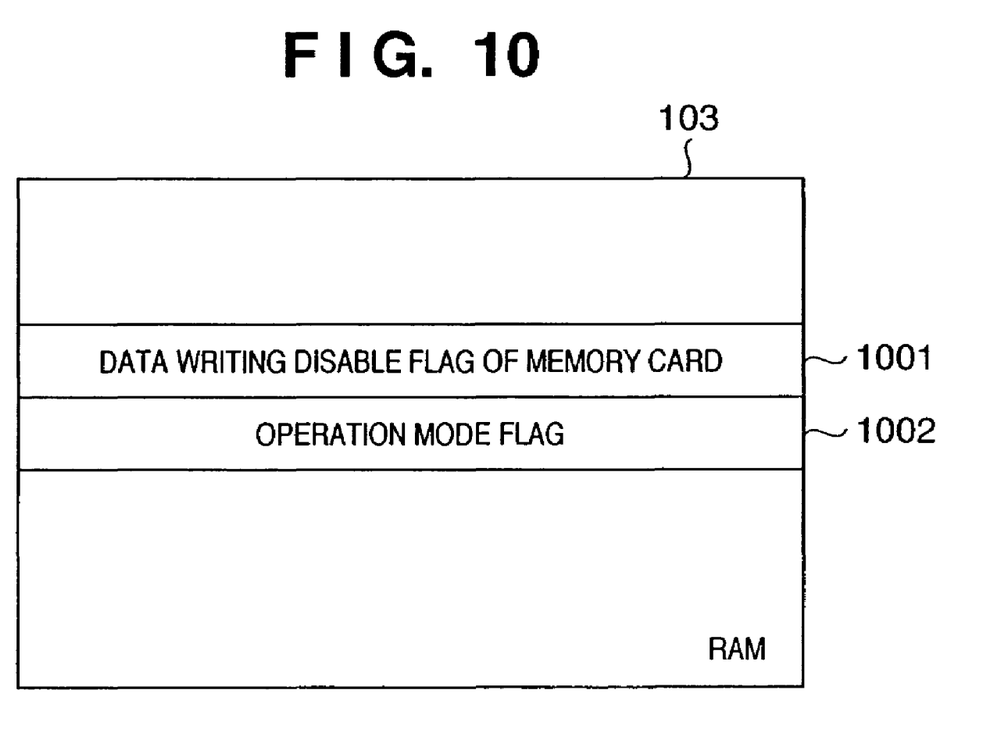
FIG. 10 is a diagram for explaining a data structure in a RAM according to the embodiment.

FIG. 10 is a diagram for explaining data stored in the RAM 103. In step S3, a data write disable flag 1001 of the memory card 118 is set to ON ("1"). In step S4, the data write disable mode is set to OFF ("0").

Figure 5:
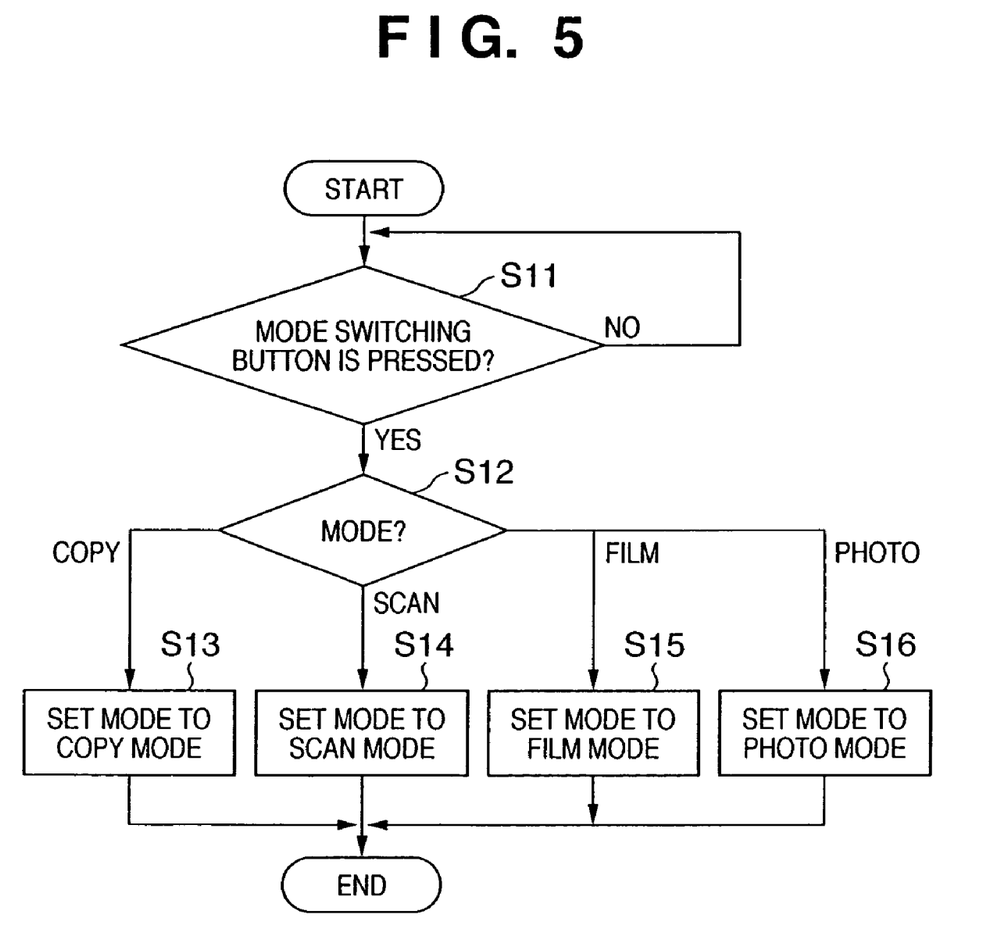
FIG. 5 is a flowchart for explaining mode switching processing in the image processing apparatus according to the embodiment.

FIG. 5 is a flowchart for explaining a mode switching processing in the image processing apparatus 100 according to this embodiment. A program for executing this processing is stored in the ROM 102 and executed by the CPU 101.

In step S11, it is determined whether any one of the mode keys 203 to 206, with which mode switching is performed, is depressed. In a case where any one of the mode keys 203 to 206 is depressed, the flow proceeds to step S12. Otherwise, in step S11, the CPU 101 continues to wait until any one of the mode keys 203 to 206 is depressed. In step S12, according to depression of the copy mode key, the scan mode key, the film mode key, and the photo mode key, it is determined which key is depressed, and a corresponding mode is set in accordance with the depressed mode keys in steps S13, S14, S15 and S16, respectively. The respective modes set in this way are stored in an operation mode flag 1002 (FIG. 10) of the RAM 103 in codes corresponding thereto.

In the explanation of this embodiment, there are the four modes. However, the invention is not limited to these modes. Although the keys corresponding to the respective modes are used for switching of modes, menu keys or the like may be used to set the modes as long as the mode can be set.

Figure 6:
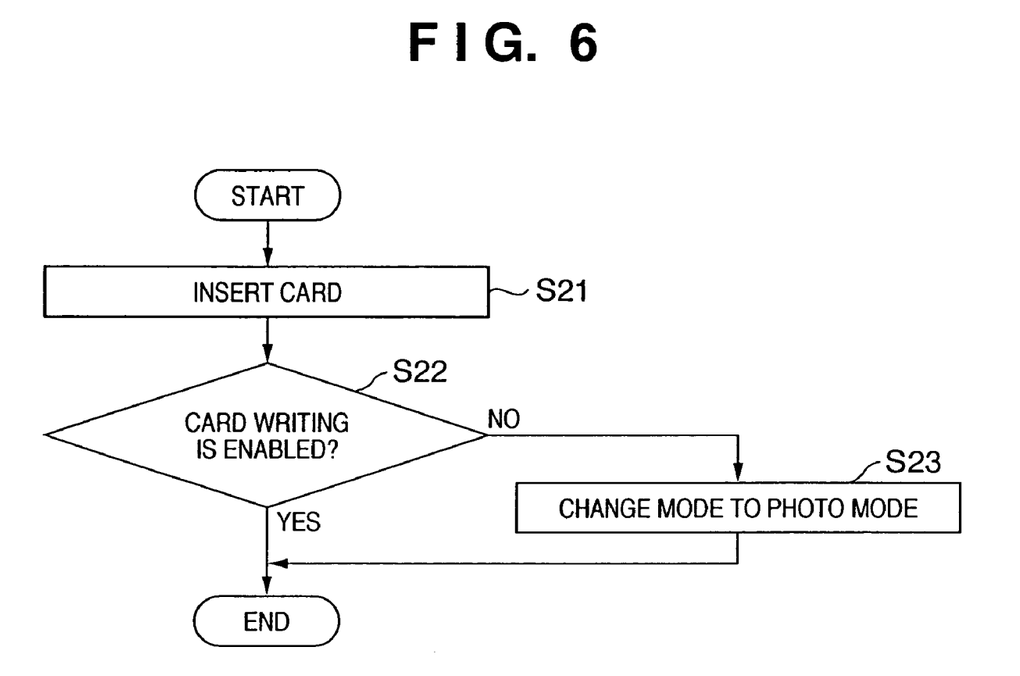
FIG. 6 is a flowchart for explaining mode switching processing in the image processing apparatus according to a first embodiment of the invention.

FIG. 6 is a flowchart for explaining mode switching processing in an image processing apparatus 100 according to a first embodiment of the invention. Note that a program for executing this processing is stored in the ROM 102 and executed according to the control of the CPU 101.

First, when the memory card 118 is mounted in step S21, the flow advances to step S22, it is determined whether or not data writing in the memory card 118 is set to "enable". In other words, the CPU 101 refers to the flag 1001 of the RAM 103 to determine whether update of data stored in the memory card 118 by the PC 119 is enabled. If the update of the data is enabled, that is, if the flag 1001 is "0", the CPU 101 ends the processing without doing anything. If data writing in the memory card 118 is "disable d" in the step S22, that is, if the flag 1001 is "1", the flow advances to step S23, a mode of the image processing apparatus 100 is set to the photo mode, a data writing mode to the memory card 118 is changed to "disable", and the processing is terminated.

According to the processing, in a case where data writing in the memory card 118 is set to "disable" at the time of mounting of the memory card 118, a mode of the image processing apparatus 100 is set to the photo mode, that is, an operation mode for disabling data writing in the memory card 118, unconditionally. Consequently, shift of an operation mode with high usability is realized.

This processing will be explained with reference to FIG. 3. It is assumed that data writing in the memory card 118 is set to "disable" and a present mode of the image processing apparatus 100 is the copy mode. In this case, when a user mounts the memory card 118 to the image processing apparatus 100, since data writing in the memory card 118 is set to "disable", it is considered that the user who has mounted the memory card 118 desires only to read out data stored in the memory card 118 using the image processing apparatus 100.

Thus, as shown in the flowchart in FIG. 6, when the memory card 118 is mounted to the image processing apparatus 100 in a state in which data writing in the memory card 118 is set to "disable", the image processing apparatus 100 automatically changes an operation mode thereof from the copy mode to the photo mode. Consequently, the user can read out and display or print image data stored in the memory card 118 in the photo mode. In the photo mode, since data writing in the memory card is disable d completely, the user does not have to worry that contents of the memory card 118 are rewritten.

On the other hand, when the memory card 118 is mounted in a state in which the image processing apparatus 100 is in the copy mode and data writing in the memory card 118 is set to "enable", it is considered that the user intends to write data in the memory card 118. In that case, when the memory card 118 is mounted in the processing in FIG. 6, the operation mode of the image processing apparatus 100 continues to be the copy mode. In other words, data writing in the memory card 118 mounted in the image processing apparatus 100 continues to be enabled.

As described above, the image processing apparatus 100 is capable of accessing the memory card 118 mounted thereto to read data from and write data in the memory card 118 and makes it possible to read data from and write data in the memory card 118 from an apparatus such as a personal computer that is connected to the image processing apparatus 100 from the outside. The image processing apparatus 100 can control accesses to the memory card 118 to set an operation mode of the image processing apparatus 100 to an operation mode close to an intention of a user. In addition, the image processing apparatus 100 can prevent the memory card 118 from being rewritten contrary to an intention of the user.

Second Embodiment

A second embodiment of the invention will be explained. In the explanation of the second embodiment, at the time when the memory card 118 is mounted, a user can select whether data writing in the memory card 118 should be enabled. Note that a hardware configuration in the second embodiment is the same as that in the first embodiment, an explanation of the hardware configuration is omitted.

Figure 7:
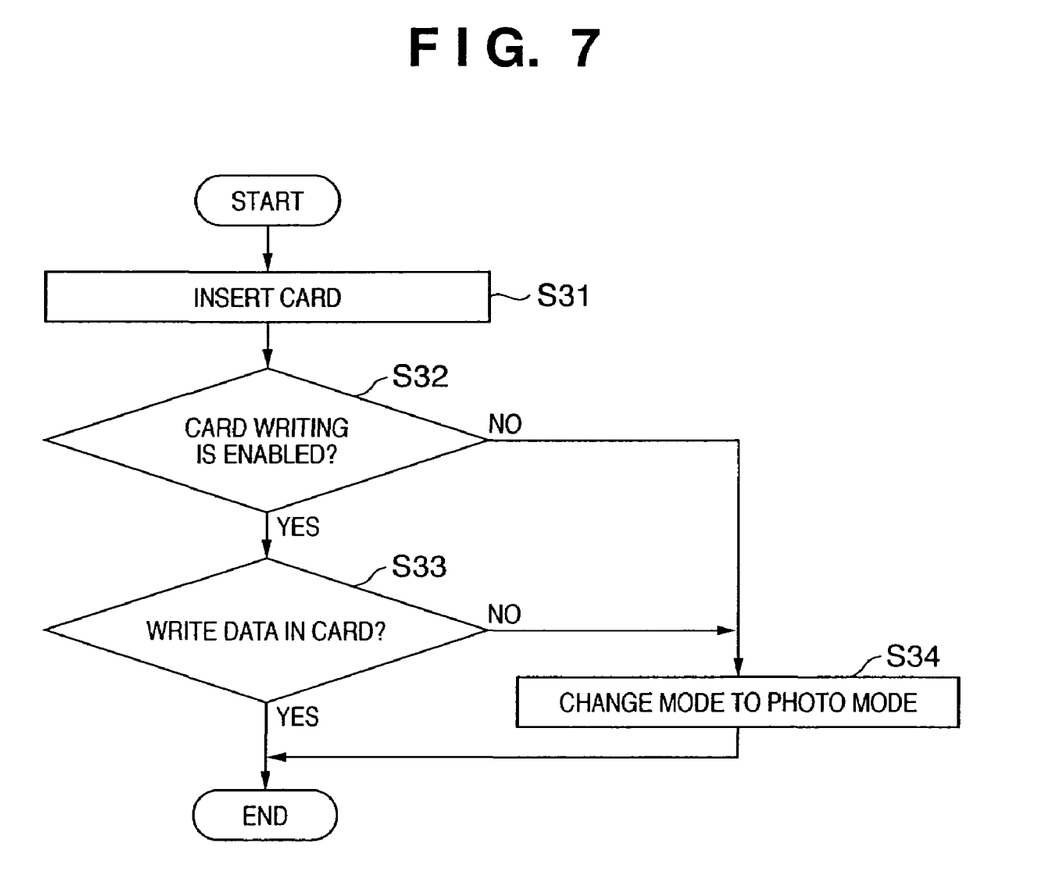
FIG. 7 is a flowchart for explaining processing in an image processing apparatus according to a second embodiment of the invention.

FIG. 7 is a flowchart for explaining processing in the image processing apparatus 100 according to the second embodiment. An example of switching of an operation mode according to mounting of the memory card 118 is explained. A program for executing this processing is stored in the ROM 102 and executed by the CPU 101.

First, when the memory card 118 is mounted in step S31, the flow proceeds to step S32 and it is determined whether or not data writing in the memory card 118 is set to "enable" as in step S22 in FIG. 6. If data writing in the memory card 118 is set to "enable", the flow proceeds to step S33 and displays a screen for inquiring a user whether the user writes data in the memory card 118 on the LCD 201. If the user sets data writing in the memory card 118 to "enable" using this screen, the processing is terminated.

In a case where data writing in the memory card 118 is set to "disable" in step S32 or in a case where the user decides in step S33 that data writing in the memory card 118 is set to "disable", the flow proceeds to step S34. The CPU 101 changes an operation mode of the image processing apparatus 100 to the photo mode and ends the processing.

According to the processing, when the memory card 118 is mounted, shift of a mode with high usability is realized by changing an operation mode of the image processing apparatus 100.

A specific example will be explained with reference to FIG. 3. It is assumed that data writing in the memory card 118 is set to "disable" and the copy mode is set. When a user mounts the memory card 118 to the image processing apparatus 100 in this state, since data writing in the memory card 118 is set to "disable", it is considered that the user desires only to view or print image data stored in the memory card 118. Therefore, in this case, when the memory card 118 is mounted, the image processing apparatus 100 shifts from the copy mode to the photo mode according to the processing in FIG. 7. Consequently, the user can read out and display or print images stored in the memory card 118 in the photo mode in a state in which data writing in the memory card 118 is disable d.

On the other hand, when data writing in the memory card 118 is set to "enable", since the image processing apparatus 100 is in the copy mode, it is considered that the user is likely to write data in the memory card 118. Therefore, in this case, the image processing apparatus 100 displays a dialog for inquiring the user whether the user writes data in the memory card 118.

Figure 9:
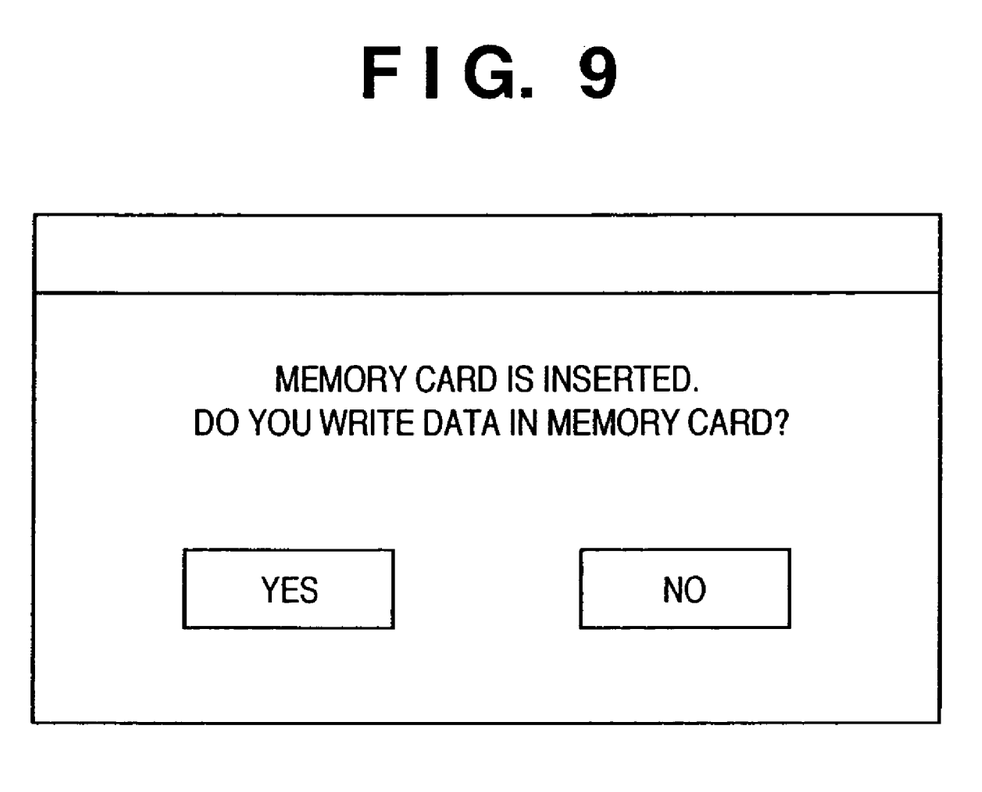
FIG. 9 depicts a view showing an example of a dialog screen according to the second and the third embodiments.

FIG. 9 depicts a view showing an example of a screen of this dialog.

If the user selects "Yes" on this screen, the CPU 101 does not change an operation mode. On the other hand, if the user selects "No" on this screen, that is, in a case where the user decides that the user does not write data in the memory card 118, the CPU 101 changes a present mode (e.g. copy mode) to the photo mode. In other words, the CPU 101 changes the present mode to a mode for disabling data writing in the memory card 118.

As described above, according to the second embodiment, the image processing apparatus 100 is capable of accessing the memory card 118 mounted thereto to read data from and write data in the memory card 118 and makes it possible to read data from and write data in the memory card 118 from an apparatus such as a personal computer connected to the image processing apparatus 100 from the outside. The image processing apparatus 100 can control accesses to the memory card 118 to set an operation mode of the image processing apparatus 100 to an operation mode close to an intention of a user. In addition, the image processing apparatus 100 can prevent the memory card 118 from being rewritten contrary to an intention of the user.

As explained above, according to the second embodiment, the image processing apparatus 100 is capable of accessing the memory card 118 mounted thereto to read data from and write data in the memory card 118. The image processing apparatus 100 can perform control for an access to the memory card 118 according to an operation mode set by the image processing apparatus 100 such that contents of the memory card 118 are not destroyed to thereby execute an operation close to an intention of a user. This makes it possible to perform operation with high usability.

The modes set in the second embodiment are only examples. The invention can also be applied to operation modes for limiting attribute values for printing such as types of operation modes, sheet sizes, and the like. The image processing apparatus 100 can process setting for not only "disable" and "enable" of data writing in the memory card 118 but also "disable" and "enable" of manipulation of data stored in the memory card 118.

The invention can be applied to a mode for accessing the memory card 118 with the image processing apparatus 100 alone and a mode for accessing the memory card 118 with an apparatus other than the image processing apparatus 100. Although the keys corresponding to the respective modes are used for switching of the modes, the respective modes may be set, for example, using a menu screen and a set key in spite of respective keys.

Third Embodiment

Figure 8:
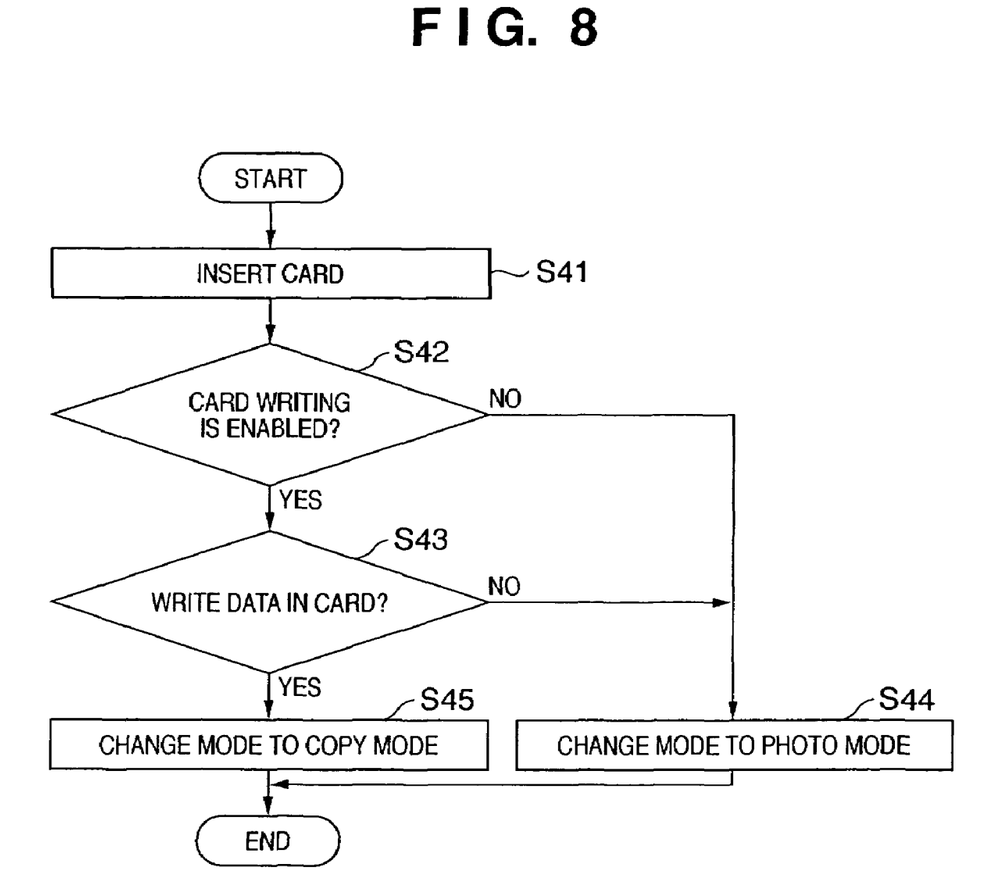
FIG. 8 is a flowchart for explaining processing in an image processing apparatus according to a third embodiment of the invention.

FIG. 8 is a flowchart for explaining processing in the image processing apparatus 100 according to a third embodiment of the invention. An example of mode switching according to mounting of the memory card 118 is described. A program for executing this processing is stored in the ROM 102 and executed by the CPU 101.

First, when the memory card 118 is mounted in step S41, the flow proceeds to step S42 and it is determined whether or not data writing in the memory card 118 is set to "enable" as in step S22 described above. If the data writing in the memory card 118 is set to "enable", the flow proceeds to step S43 and displays a screen for inquiring a user whether the user writes data in the memory card 118. When the user answers that the user writes data in the memory card 118, the flow proceeds to step S45 and sets a present mode to the copy mode. This makes it possible to rewrite the memory card 118.

In a case where data writing in the memory card 118 is not set to "enable" in step S42 or in a case where the user answers in step S43 that data writing in the memory card 118 is not performed, the flow proceeds to step S44. The CPU 101 changes an operation mode to the photo mode as in step S23 of the flowchart in FIG. 6 and ends the processing.

This example will be explained with reference to FIG. 3. It is assumed that data writing in the memory card 118 is set to "disable" and an operation mode is set to the copy mode. In this case, when a user mounts the memory card 118 to the image processing apparatus 100, since data writing in the memory card 118 is set to "disable", it is considered that the user only desires to view or print data stored in the memory card 118. Therefore, in this case, when the memory card 118 is mounted, the image processing apparatus 100 shifts from the copy mode to the photo mode. In this way, the user can read out and display or print image data stored in the memory card 118 in the photo mode.

On the other hand, if data writing in the memory card 118 is set to "enable", when the user mounts the memory card 118 to the image processing apparatus 100, it is considered that the user desires to write data in the memory card 118. Thus, in this case, when the memory card 118 is mounted, the image processing apparatus 100 displays a dialog for inquiring the user whether the user writes data in the memory card 118 (FIG. 9).

If the user selects "Yes" in this dialog and instructs the image processing apparatus 100 to write data in the memory card 118, in step S45, the image processing apparatus 100 changes a present operation mode to the copy mode and enables data writing in the memory card 118.

On the other hand, if the user selects "Yes" in the dialog and decides that the user does not write data in the memory card 118, in step S44, the image processing apparatus 100 changes the operation mode to the photo mode. In other words, the image processing apparatus 100 changes operation mode to an operation mode for allowing the user only to refer to image data stored in the memory card 118.

In this way, in a case where the user desires to write data in the memory card 118, the image processing apparatus 100 can operate in the operation mode for writing data in the memory card 118. In a case where the user does not desire to write data in the memory card 118, processing is performed in the mode for referring to image data stored in the memory card 118.

As explained above, it is possible to cause the image processing apparatus 100, which can access the memory card 118 mounted thereto, to perform an operation close to an intention of the user while performing exclusive processing for an access to the memory card 118. As a result, it is possible to perform operation with high usability.

The operation modes set in the above described embodiment are only examples. The invention can also be applied to operation modes for limiting attribute values for printing such as types of print sheet, sheet sizes, and the like.

When there is a mode for performing processing for writing data in the memory card 118 with the image processing apparatus 100 alone and a mode for performing processing for writing data in the memory card 118 from the outside, the setting described above may be applied for each of the modes.

In the explanations of the embodiments, an operation mode is changed to the photo mode in a case where data writing in the memory card 118 is disable d. However, the invention is not limited to this. If there is an operation mode for simply referring to contents of the memory card 118, the operation mode may be set.

Other Embodiment

As described above, the object of the invention is also attained when a system or an apparatus is provided with a storage medium, which has stored therein a program code of software for realizing the functions of the embodiments, and a computer (or a CPU or an MPU) of the system or the apparatus reads out and executes the program code stored in the storage medium. In this case, the program code itself read out from the storage medium realizes the functions of the embodiments. The storage medium having stored therein the program code constitutes the invention. As the storage medium for supplying such a program code, for example, a floppy (registered trademark) disk, a hard disk, an optical disk, a magneto-optical disk, a CD-ROM, a CD-R, a magnetic tape, a nonvolatile memory card, a ROM, and the like can be used.

In this way, the functions of the embodiments are realized when the computer executes the program code read out from the storage medium. Besides, an operating system (OS) or the like running on the computer performs actual processing partially or entirely on the basis of an instruction of the program code and the functions of the embodiments are also realized by the processing.

Moreover, after the program code read out from the storage medium is written in a memory, which is provided in a function extending board inserted in the computer or a function extending unit connected to the computer, a CPU or the like provided in the function extending board or the function extending unit performs actual processing partially or entirely. The functions of the embodiments are also realized by the processing.

The present invention is not limited to the above embodiment, and various changes and modifications can be made thereto within the spirit and scope of the present invention. Therefore, to apprise the public of the scope of the present invention, the following claims are made.

CLAIM OF PRIORITY

This application claims priority from Japanese Patent Application No. 2004-258407 filed on Sep. 6, 2004, which is hereby incorporated by reference herein.

What is claimed is:

1. An information processing apparatus having a plurality of operation modes, comprising:
    an interface unit configured to connect with a memory card;
    mode setting means for setting either a first operation mode or a second operation mode, wherein the first operation mode is operable in a write enable state for enabling data writing in the memory card or a write disable state for disabling data writing in the memory card and the second operation mode is operable in the write disable state;
    disable state setting means for setting the write disable state; and
    mode change means for, in a case where the memory card is connected to said interface unit and the write disable state is set by said disable state setting means, changing the first operation mode set by said mode setting means to the second operation mode.

2. The information processing apparatus according to claim 1, further comprising:
    a user interface unit configured, in a case where the memory card is connected to said interface unit and the write disable state is not set by said disable state setting means, to inquire of a user whether the user enables data writing in the memory card; and
    means for changing, in a case where the user designates the write disable state, the first operation mode to the second operation mode.

3. The information processing apparatus according to claim 2, further comprising:
    a unit configured to maintain the first operation mode, in a case where a user designates the write enable state.

4. The information processing apparatus according to claim 1, wherein the write disable state is a state for disabling data writing in the memory card from an external apparatus, which is connected to the information processing apparatus through an interface.

5. A control method for an information processing apparatus having a plurality of operation modes for accessing a memory card connected to the information processing apparatus through an interface, the control method comprising:

a mode setting step of setting either a first operation mode or a second operation mode, wherein the first operation mode is operable in a write enable state for enabling data writing in the memory card or a write disable state for disabling data writing in the memory card and the second operation mode is operable in the write disable state;

a disable state setting step of setting the write disable state; and a mode changing step of changing, in a case where the memory card is connected through the interface and the write disable state is set in the disable state setting step, the first operation mode to the second operation mode.

6. The control method according to claim 5, further comprising:

an inquiring step of inquiring, in a case where the memory card is connected through the interface and the write disable state is not set in said disable state setting step, a user whether the user enables data writing in the memory card; and a step of changing, in a case where the user designates the write disable state in response to an inquiry in said inquiring step, the first operation mode to the second operation mode.

7. The control method according to claim 6, further comprising:

a step of maintaining the first operation mode, in a case where a user designates the write enable state in response to an inquiry in said inquiring step.

8. The control method according to claim 5, wherein the write disable state is a state for disabling data writing in the memory card from an external apparatus through the information processing apparatus.

* * * * *